(12) United States Patent
Baldauf

(10) Patent No.: US 8,789,766 B2
(45) Date of Patent: Jul. 29, 2014

(54) MIXING DEVICE FOR AIRCRAFT AIR CONDITIONING SYSTEM

(75) Inventor: Georg Baldauf, Lindenberg (DE)

(73) Assignee: Liebherr-Aerospace Lindenberg GmbH, Lindenberg (DE)

( * ) Notice: Subject to any disclaimer, the term of this patent is extended or adjusted under 35 U.S.C. 154(b) by 1164 days.

(21) Appl. No.: 12/074,367

(22) Filed: Mar. 3, 2008

(65) Prior Publication Data

US 2008/0251592 A1   Oct. 16, 2008

(30) Foreign Application Priority Data

Mar. 2, 2007   (DE) .................. 10 2007 010 268

(51) Int. Cl.
  *B01F 3/02*   (2006.01)
  *B01F 13/04*   (2006.01)
  *B64D 13/08*   (2006.01)
  *F24F 13/10*   (2006.01)

(52) U.S. Cl.
  USPC ............. 237/12.3 A; 237/28; 237/46; 237/50; 137/3; 137/81.1; 137/455; 137/511; 137/602; 165/41; 165/202; 165/281; 454/241; 454/76; 454/126; 454/142; 454/261; 366/336; 366/337; 366/341

(58) Field of Classification Search
  CPC ............ B01F 3/02; B01F 5/0082; B01F 5/10; B01F 13/0011; B01F 13/04; B01F 15/00785; B64D 13/08; F24F 7/06; F24F 7/007
  USPC ........ 237/12.3 A, 28, 50, 5; 137/3, 81.1, 455, 137/511, 599.12, 602, 896; 165/41, 96, 97, 165/100, 101, 200, 201, 202, 213, 216, 281, 165/286; 454/237, 76, 126, 142, 234, 241, 454/261, 264, 265, 266, 267, 268, 319; 366/336, 337, 341
  See application file for complete search history.

(56) References Cited

U.S. PATENT DOCUMENTS

| | | | | |
|---|---|---|---|---|
| 76,717 | A * | 4/1868 | Crane | 454/266 |
| 1,300,416 | A * | 4/1919 | Koenig | 165/95 |
| 2,085,761 | A * | 7/1937 | Lysholm | 60/268 |
| 2,370,035 | A * | 2/1945 | Heymann | 244/118.5 |
| 2,400,617 | A * | 5/1946 | Wheller | 454/266 |
| 2,465,728 | A * | 3/1949 | Johnson | 244/118.5 |
| 2,521,866 | A * | 9/1950 | Ott | 126/110 R |
| 2,628,482 | A | 2/1953 | Burgess | |
| 2,674,177 | A * | 4/1954 | Grandstaff | 454/264 |
| 2,884,228 | A * | 4/1959 | Jorgensen | 165/65 |
| 3,187,768 | A * | 6/1965 | Waterfill | 137/514 |

(Continued)

FOREIGN PATENT DOCUMENTS

| | | | | |
|---|---|---|---|---|
| DE | 3715133 | | 11/1988 | |
| DE | 3817215 C1 * | | 7/1989 | F24F 13/04 |

(Continued)

*Primary Examiner* — Kang Hu
*Assistant Examiner* — Daniel E Namay
(74) *Attorney, Agent, or Firm* — Dilworth & Barrese, LLP.

(57) ABSTRACT

This invention relates to a mixing device for an aircraft air conditioning system with a supply conduit for fresh air from the air conditioning system, with a second supply conduit for recirculated air from a pressurized region of the aircraft, and with a discharge conduit for supplying mixed air into the pressurized region of the aircraft, wherein a non-return valve is integrated in the mixer.

12 Claims, 2 Drawing Sheets

(56) References Cited

U.S. PATENT DOCUMENTS

| | | | |
|---|---|---|---|
| 3,203,473 A * | 8/1965 | Goode et al. | 165/296 |
| 3,212,424 A * | 10/1965 | Davis | 454/268 |
| 3,405,758 A * | 10/1968 | Walker et al. | 165/249 |
| 3,911,804 A * | 10/1975 | Tao | 454/261 |
| 4,203,485 A * | 5/1980 | Zilbermann et al. | 165/217 |
| 4,301,833 A * | 11/1981 | Donald, III | 137/521 |
| 4,328,926 A * | 5/1982 | Hall, Jr. | 236/13 |
| 4,350,100 A * | 9/1982 | Stephenson | 110/203 |
| 4,470,342 A * | 9/1984 | Hall, Jr. | 454/267 |
| 4,582,252 A * | 4/1986 | Ogihara et al. | 237/12.3 A |
| 4,793,247 A * | 12/1988 | Verweij | 366/338 |
| 5,031,514 A * | 7/1991 | Kice | 454/250 |
| 5,463,967 A * | 11/1995 | Gielow et al. | 110/104 R |
| 6,318,096 B1 * | 11/2001 | Gross et al. | 62/122 |
| 6,346,041 B1 * | 2/2002 | Desmond et al. | 454/268 |
| 6,408,228 B1 * | 6/2002 | Seem et al. | 700/276 |
| 6,478,671 B2 * | 11/2002 | Murai et al. | 454/156 |
| 6,519,969 B2 | 2/2003 | Sauterleute | |
| 6,547,433 B2 * | 4/2003 | Yazici et al. | 366/336 |
| 6,715,713 B2 * | 4/2004 | Marche | 244/57 |
| 6,971,607 B2 | 12/2005 | McColgan et al. | |
| 7,331,853 B2 * | 2/2008 | Lee et al. | 454/237 |
| 8,430,730 B2 * | 4/2013 | Feisthammel et al. | 454/76 |
| 8,500,320 B2 * | 8/2013 | Andresen et al. | 366/177.1 |
| 2002/0004367 A1 * | 1/2002 | Murai et al. | 454/156 |
| 2005/0061913 A1 | 3/2005 | McColgan et al. | |
| 2007/0004328 A1 * | 1/2007 | Balzer | 454/185 |
| 2008/0210816 A1 * | 9/2008 | Feisthammel et al. | 244/118.5 |
| 2008/0242210 A1 * | 10/2008 | Viertel et al. | 454/76 |

FOREIGN PATENT DOCUMENTS

| | | | |
|---|---|---|---|
| DE | 19963280 | 8/2001 | |
| DE | 102007002138 | 7/2008 | |
| EP | 260736 | 3/1988 | |
| EP | 260736 A1 * | 3/1988 | B01F 5/04 |
| EP | 303850 A2 * | 2/1989 | B01F 3/02 |
| EP | 1188666 | 3/2002 | |
| FR | 1261312 | 4/1961 | |
| FR | 1281715 | 1/1962 | |
| JP | 61195286 A * | 8/1986 | F28F 3/00 |
| WO | 96/25329 | 8/1996 | |

* cited by examiner

PRIOR ART

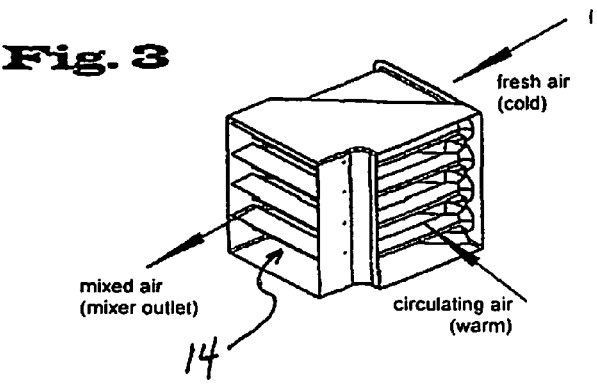
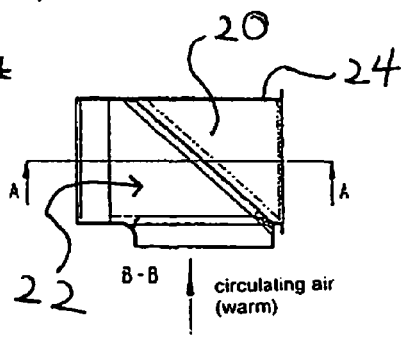
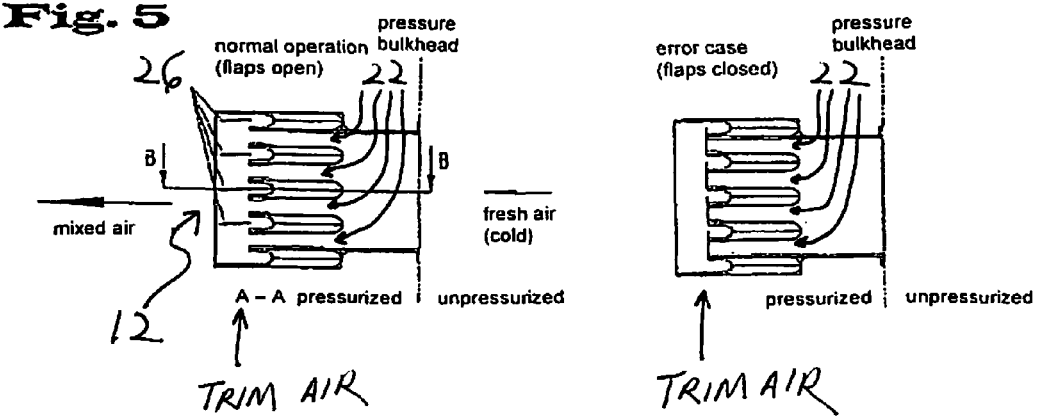

MIXING DEVICE FOR AIRCRAFT AIR CONDITIONING SYSTEM

BACKGROUND OF THE INVENTION

This invention relates to a mixing device for an aircraft air conditioning system with a supply conduit for fresh air from the air conditioning system, with a second supply conduit for recirculated air from a pressurized region of the aircraft, and with a discharge conduit for supplying mixed air into the pressurized region of the aircraft.

Aircraft air conditioning systems serve to provide conditioned air for the various regions of the aircraft, for instance for the aircraft cabin or for the cockpit.

In particular, this invention now relates to a component for mixing and/or dividing various streams of air. In the process, fresh air from the air conditioning system is mixed with air from the aircraft cabin and recirculated to the cabin via a distribution system.

Under normal circumstances, the problem arises that all components which protrude into the flow will ice under operating conditions in which the air is very cold and saturated with moisture.

To solve this problem, it has already become known from U.S. Pat. No. 6,971,607 B2 to enclose a first supply conduit for fresh air from the air conditioning system with a second supply conduit for recirculated air from the aircraft cabin in its terminal region, wherein both supply conduits open into a discharge conduit for supplying mixed air into the aircraft cabin. Comparatively warm recirculated air from the aircraft cabin thus surrounds the cold fresh air flowing out of the air conditioning system, so that icing as a result of the heat transfer from the warm air can be prevented. The discharge conduit for supplying fresh air into the cockpit branches off from the first supply conduit for fresh air from the air conditioning system. This results in a very complex component for the mixing chamber.

From the non-prepublished German patent application 10 2007 002 138.2 a mixing device for aircraft air conditioning systems is already known, which consists of pockets arranged one above the other in flow cross-section, which partly have a free cross-section and partly include a diagonal partition.

As shown in FIG. 1, premixing cold fresh air from the air conditioning system with warm circulating air from the cabin conventionally has so far been effected in the unpressurized region in the aircraft. For this purpose, the warm circulating air is passed from the cabin through the so-called pressure bulkhead into the unpressurized region. The mixed, ice-free air is recirculated to the cabin via a non-return flap. To maintain the cabin pressure in a case of error, i.e. for instance in the case of a conduit breaking in the unpressurized region, the circulating air conduit in the pressure bulkhead is closed by a further safety valve. In this variant, the non-return flap is provided downstream of the mixer, so that the non-return flap is supplied with warmer mixed air as compared to the cold fresh air and thus remains ice-free.

However, the solution as described above leads to a rather complex construction, as on the one hand a safety valve and on the other hand a non-return flap must be provided in the pressure bulkhead as separate components.

SUMMARY OF THE INVENTION

It is the object of the present invention to develop a generic aircraft air conditioning system such that the same can be designed with fewer components and therefore less expensive and of lighter weight.

In accordance with the invention, this object is solved by the combination of the features herein. Accordingly, a mixing device for an aircraft air conditioning system is provided with a supply conduit for fresh air from the air conditioning system, with a second supply conduit for supplied air from a pressurized region of the aircraft, and with a discharge conduit for supplying mixed air into the pressurized region of the aircraft, in which a non-return valve is integrated.

Due to this solution in accordance with the invention, a compact, space-saving construction is possible, as the separate configuration of the non-return flap with its housing, which so far had to be arranged in the pressure bulkhead, can be omitted. Furthermore, in the pressurized region of the aircraft, i.e. in the aircraft cabin, the circulating air supplied in the mixer no longer needs to be delivered into the unpressurized region of the aircraft by means of a pipe conduit and a safety valve. Especially due to the omission of additional pipe conduits, the pressure losses in the entire conduit system are distinctly reduced, so that the corresponding circulating air blower can be designed with a reduced performance. The omission of the safety valve and the additional pipe conduit leads to a noticeable saving of weight.

Particular aspects can also be taken from the description herein.

In accordance with an advantageous aspect of the invention, the mixing device can consist of pockets arranged one above the other in flow cross-section, corresponding to the configuration according to the non-prepublished DE 10 2007 002 138.2, which pockets for the one part have a free cross-section, in order to deliver the fresh air from the air conditioning system into the discharge conduit for supplying mixed air into the pressurized region of the aircraft, and for the other part include a diagonal partition, in order to deliver recirculated air from the pressurized region of the aircraft into the discharge conduit for supplying mixed air into the pressurized region of the aircraft.

Accordingly, differently designed pockets can alternately be arranged one above the other in several layers. Here, for instance 10 to 20 pockets should be arranged one above the other in one mixing device.

Advantageously, hot process air can also be branched off from the air conditioning system and be supplied to the mixing device, in order to thereby prevent icing even more reliably.

Advantageously, the pockets can have a substantially triangular base area.

Particularly advantageously, the non-return valve is formed in that the outlet slots formed by the spaces between the pockets can be closed for the cold fresh air originating from the air conditioning system by means of flaps.

The flaps can be pivotally mounted to the edge of the outlet slots so as to hang downwards. Thus, it is possible that the flaps are open in the warm circulating air flow and hence remain ice-free. Only in a case of error will the cold fresh air path in the mixer be closed by the flaps being shut.

BRIEF DESCRIPTION OF THE DRAWINGS

Further features, details and advantages of the invention will be explained in detail with reference to an embodiment illustrated in the drawing, in which:

FIG. 3: shows a perspective view of the mixing device of the invention;

FIG. 4: shows a representation along section line B-B corresponding to FIG. 5;

FIG. 5: shows a sectional representation corresponding to section line A-A of FIG. 4 in a first operating position; and FIG. 6: shows a representation corresponding to FIG. 5 in a second operating position.

DESCRIPTION OF THE PREFERRED EMBODIMENTS

Figure 1:
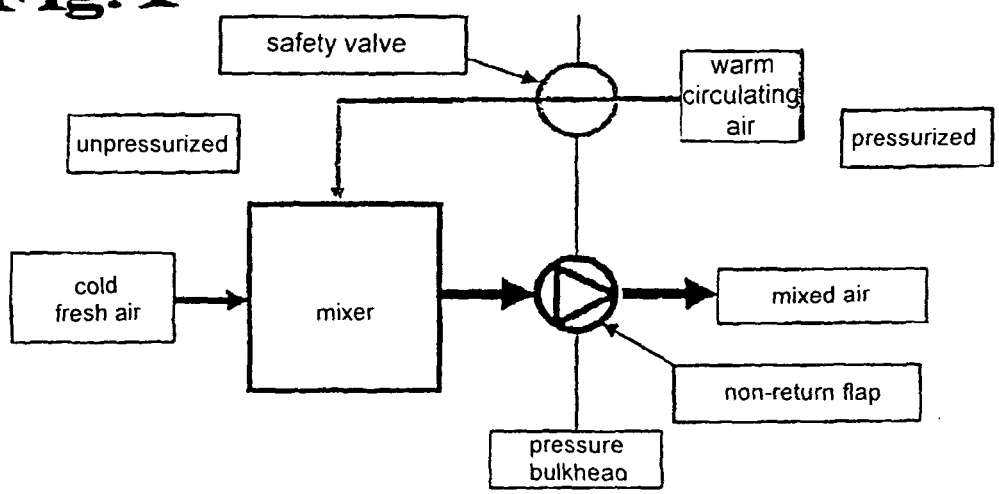
FIG. 1: shows a schematic diagram of the mounting situation of the mixer and the process streams in the aircraft corresponding to the prior art.
Figure 2:
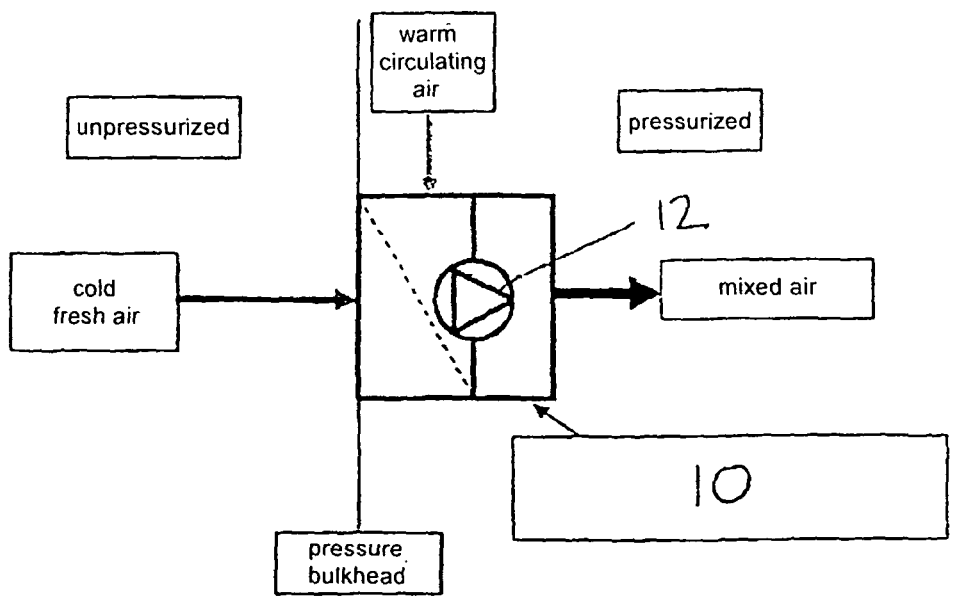
FIG. 2: shows the schematic diagram of FIG. 1 according to the solution of the invention.

With reference to FIG. 2, the arrangement of a mixing device 10 is shown, which includes an integrated non-return flap 12. The mixing device 10 here is disposed in the pressurized region of the non-illustrated aircraft. From the unpressurized region, cold fresh air is supplied to the mixing device 10. From the pressurized region, for instance also from the aircraft cabin, warm circulating air is supplied to the mixing device inside the pressurized region and mixed with the cold fresh air. The corresponding mixed air likewise is discharged from the mixing device 10 in the pressurized region. The non-return valve 12 disposed in the mixing device 10 in accordance with the invention prevents a pressure drop in the pressurized region, when a conduit breaks in the unpressurized region or a leakage occurs.

With reference to FIGS. 3 to 6, a constructive aspect of the mixing device of the invention is shown. The same substantially corresponds to the construction of DE 10 2007 002 138.2 of the same applicant, to which reference is made in addition.

The mixing device 10 here consists of substantially triangular pockets 20 arranged one above the other, which are arranged in the flow cross-section of the substantially box-shaped mixer 10 by forming spaces 22. The function of the pockets 20 consists in that the warm circulating air entering from the pressurized region, i.e. the aircraft cabin, is deflected by 90° and is discharged again from the mixed air outlet 14 as part of the mixed air. At the mixed air outlet 14, this circulating air deflected by 90° mixes with the fresh air flowing through the mixing device 10 in the vicinity of the spaces 22 between the pockets 20.

In the sectional representation of FIG. 4, the substantially triangular pocket 20 is shown with its rear wall 24. The circulating air flow and the fresh air flow each are indicated by the corresponding arrows. From the sectional representation A-A of FIG. 5 it can be taken that individual flaps 26 are arranged as non-return flap 12 in the vicinity of the spaces between the pockets 20. The cold fresh air originating from the unpressurized region flows through these spaces 22, as stated above. If a leakage occurs in the fresh air conduit in the unpressurized part of the aircraft, the flaps pivotally mounted to the corresponding pockets 20 fall downwards as a result of gravity and close the slots 22, which provide the connection between the unpressurized part and the pressurized part. In this way, these flaps, which in FIG. 6 are shown in the closed position, form a non-return valve of simple construction.

Since the non-return flaps 26 are mounted in the warm circulating air slots and are aligned in the warm circulating air flow during operation of the mixing device, they remain ice-free. Only in a case of error will the cold fresh air path in the vicinity of the slots 22 in the mixing device 10 be closed by the non-return flaps 26 being shut. The corresponding arrangement of the non-return flaps 26 in the mixer provides the following advantages:

icing-robust construction of the non-return flaps by heating the flaps with warm circulating air;

redundant system by using a plurality of flaps, which means that in the case of failure of one flap the total function still exists in part;

simplified, space-saving and inexpensive system of conduits.

In the present embodiment, four flaps are shown. There can, however, also be used other embodiments with fewer flaps, for instance one or two flaps or also more flaps in accordance with the present invention.

In the present embodiment, a fresh air connection is shown. Instead of the one fresh air connection, two or more connections can, however, also be provided. Likewise, two or more connections for the circulating air can be provided instead of the one circulating air connection shown here. Finally, additional connections for tapping fresh air can be provided. Moreover, the flaps 26 can not only be heated with circulating air, but also with hot fresh air, i.e. so-called trim air, from the air conditioning system, which is supplied in a manner not illustrated here in detail.

The invention claimed is:

1. A mixing device for an aircraft air conditioning system comprising a first supply conduit receiving and conveying fresh air from the air conditioning system situated in an unpressurized region of the aircraft, a second separate supply conduit receiving and conveying recirculated air from a pressurized region of the aircraft, a mixer (10) communicating with outlets of said respective first and second supply conduits and respectively receiving and mixing the fresh and recirculated air, a discharge conduit both receiving mixed air from the mixer (10) and supplying the mixed air into the pressurized region of the aircraft, and a gravity actuated non-return valve (12) integrally-arranged within the mixer (10), the mixer (10) being box-shaped and having front, back and two side walls, an opening through a first of said walls and communicating with said first supply conduit for receiving the fresh air, an opening through a second of said walls and communicating with said second separate supply conduit for receiving the recirculated air, an opening (14) through a third of said walls for discharging the mixed air, the non-return valve (12) integrally-arranged within the mixer (10) between all four walls, and the mixer (10) comprises pockets (20) arranged one above the other in flow cross-section, which have a free cross-section to deliver the fresh air from the air conditioning system into the discharge conduit for supplying mixed air into the pressurized region of the aircraft, and include a diagonal partition arranged to guide recirculated air from the pressurized region of the aircraft into the discharge conduit for supplying mixed air into the pressurized region of the aircraft.

2. The mixing device according to claim 1, wherein the pockets (20) are alternately arranged one above the other in several layers.

3. The mixing device according to claim 1, wherein 10 to 20 pockets are arranged one above the other.

4. The mixing device according to claim 1, receiving hot process air (trim air) branched off from the air conditioning system and supplied into the mixing device.

5. The mixing device according to claim 1, wherein the pockets (20) each have a substantially triangular base area.

6. The mixing device according to claim 1, wherein the non-return valve (12) is formed with outlet slots formed by pockets (22) being closable for cold fresh air originating from the air conditioning system by flaps (26).

7. The mixing device according to claim 6, wherein the flaps (26) are pivotally mounted to the edge of the outlet slots to hang downwardly.

8. The mixing device according to claim 1, wherein the pockets (20) are made of sheet metal.

9. The mixing device according to claim 6, wherein the non-return flaps (26) are mounted in warm circulating air slots and surrounded by warm circulating air.

10. The mixing device according to claim 9, wherein the non-return flaps additionally are surrounded by trim air.

11. The mixing device according to claim 1, wherein the non-return valve (12) is integrally-arranged within the mixer (10) to prevent pressure drop in the pressurized region when a conduit in the unpressurized region breaks or leakage occurs.

12. The mixing device according to claim 1, wherein said three openings are arranged to receive the fresh air from a first direction and recirculated air from a second direction, and discharge the mixed air in a third direction.

* * * * *